UNITED STATES PATENT OFFICE.

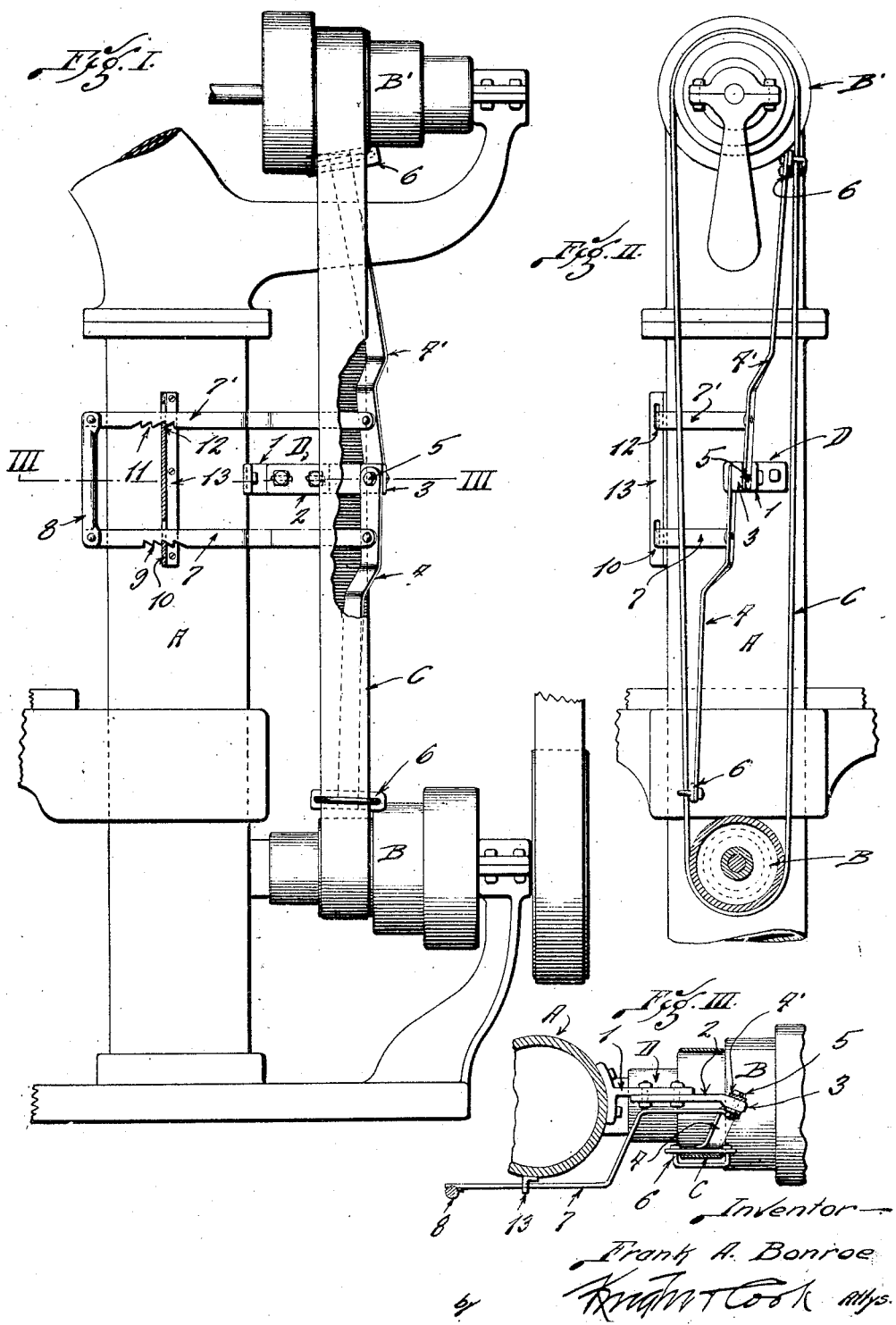

FRANK A. BONROE, OF WEBSTER GROVES, MISSOURI.

BELT-SHIFTING DEVICE.

1,374,811.                    Specification of Letters Patent.    Patented Apr. 12, 1921.

Application filed November 1, 1919.   Serial No. 335,159.

*To all whom it may concern:*

Be it known that I, FRANK A. BONROE, a citizen of the United States of America, a resident of Webster Groves, in the county of St. Louis and State of Missouri, have invented certain new and useful Improvements in Belt-Shifting Devices, of which the following is a full, clear, and exact description, reference being had to the accompanying drawings, forming a part of this specification.

My invention relates to a belt shifting device for use in adjusting power belts on stepped cone pulleys, and has for its object the production of a simple device of this kind by which the power belt may be thrown from one step to another on each of two cone pulleys without the operator leaving his position of work at a machine driven by the power belt.

Fig. I is a side elevation, partly in section, showing my belt shifting device applied to a drill press.

Fig. II is rear elevation of the belt shifting device and the machine parts shown in Fig. I.

Fig. III is a horizontal section taken on line III—III, Fig. I.

In the accompanying drawings, I have, for the purpose of illustration of my invention, shown my belt shifting device as used for shifting the power belt of a drill press, although it may be used upon other types of machines. A designates the column of the drill press B, B' stepped cone pulleys, and C a power belt adapted to be shifted on the cone pulleys.

A bracket D, secured to the column A intermediate of the pulleys B and B', comprises a stationary member 1 and an arm 2 adjustably secured to said stationary member in any suitable manner, as, for example, by slot and bolt connection as shown. Said bracket may be in the main in alinement with the axes of the cone pulleys B, B' or may be inclined relative to said axes, but in any event includes an outer portion 3 disposed at an angle to said axes, as seen most clearly in Fig. III, this angle portion of the bracket being provided for a purpose which will be hereinafter made clear.

4, 4' designate belt shifting arms pivoted at 5 to the angle portion of the bracket D. These belt shifting arms extend into proximity to the cone pulleys B, B', each arm terminating in a suitable belt engaging member 6 which may be in the form of a yoke or fork, and which engages the belt C in close proximity to one of the cone pulleys.

Actuating means for moving the belt shifting arms includes lower and upper operating rods 7, 7' pivoted, respectively, to the belt shifting arms 4, 4' preferably in proximity to the point or pivotal connection of said shifting arms to the bracket D. The operating rods 7, 7' extend forwardly from the belt shifting arm and are preferably arranged substantially parallel with each other. A handle bar 8, pivoted to said operating rods, provides for the manipulation of said rods, as will hereinafter fully appear. The lower operating rod 7 is provided at its lower edge with teeth 9 which engage a keeper 10 mounted on the column A, and the operating rod 7' is provided at its lower edge with teeth 11 which engage a keeper 12 also mounted on the column A, the keepers being shown as included in a single keeper bar 13, but it is obvious that they may be separate members. The teeth on one of the operating rods face rearwardly, while those upon the other operating rod face forwardly, and consequently when a pull is exerted upon the handle bar 7 connecting the operating rods one of the rods will be drawn forwardly, while the other operating rod will be held from movement in a like direction, due to the teeth thereon so engaging the keeper to which they are fitted as to prevent a forward movement. Similarly, if pressure is applied to the handle bar 8, the operating rod held from movement in the first instance rides in engagement with its keeper, while the other operating rod is being moved to operate the shifting arm corresponding thereto.

In the operation of my belt shifting device as illustrated in the drawings, the action would be as follows:

The operator by grasping the handle bar 8 and moving it rearwardly would move the upper operating rod 7' rearwardly, the teeth on said rod riding in engagement with the keeper 12. By such movement of the operating rod 7' the belt shifting arm 4' is thrown rearwardly and the belt is carried from one step of the cone pulley B' to a step on the pulley at the rear of said step. To position the belt on a rearward step of the cone pulley B, the operator elevates the handle bar 8 sufficiently to lift the teeth 9 of the lower operating rod out of engagement with the keeper 10, and then by a rearward pressure on said handle bar imparts a rearward thrust to said operating rod, with the result of causing it to impart movement to the belt shifting arm 4 whereby the belt shifting arm 4 is caused to move the power belt onto a step of the cone pulley B at the rear of that previously occupied by the belt. To shift the belt in the opposite direction on the cone pulleys, the operating rods are moved in directions the reverse of those above set forth, and the power belt is therefore carried in a forward direction instead of in a rearward direction on the cone pulleys. As previously stated, the supporting bracket to which the belt shifting arms 4 and 4' are pivoted includes a portion arranged at an angle to the axes of the cone pulleys. As a consequence of this angular relation of the portion of the support to which the belt shifting arms are pivoted, said arms are caused to move at an angle to the axes of the cone pulleys, and they therefore turn the portions of the belt adjacent to the pulleys at angles to the axes of the pulleys, so that the belts will readily ride onto the higher steps of the pulleys when they are moved toward said higher steps, as distinguished from being forced against the ends of the steps as would otherwise result and would make it difficult to shift the belt onto a higher step.

The bracket D is made adjustable to properly locate the pivot point 5 at which the belt shifting arms 4, 4' are located relative to different forms of cone pulleys, i. e., cone pulleys having numbers of steps, and also to properly locate said pivot point to suit cone pulleys having different lengths of steps.

I claim:

1. A belt shifting device of the character described comprising a pair of pivotally supported belt shifting arms, toothed operating rods for moving said arms, keepers engaged by the teeth on said rods for selectively controlling the movement of the rods, and a handle connecting said rods.

2. In a device for shifting a power belt on cone pulleys, a pair of belt shifting arms in the form of levers, a support comprising a bracket having an extension arm adjustable in line with the axes of the pulleys, said levers being pivoted to said adjustable extension arm, and operating means pivoted to said levers.

In testimony that I claim the foregoing I hereunto affix my signature.

FRANK A. BONROE.